(12) United States Patent
Verma

(10) Patent No.: US 8,321,388 B1
(45) Date of Patent: Nov. 27, 2012

(54) SYSTEMS AND METHODS FOR BACKING UP MULTIMEDIA DATA

(75) Inventor: Amit Verma, Ghaziabad (IN)

(73) Assignee: Symantec Corporation, Mountain View, CA (US)

( * ) Notice: Subject to any disclaimer, the term of this patent is extended or adjusted under 35 U.S.C. 154(b) by 120 days.

(21) Appl. No.: 12/914,993

(22) Filed: Oct. 28, 2010

(51) Int. Cl.
*G06F 7/00* (2006.01)
*G06F 17/00* (2006.01)

(52) U.S. Cl. ........................... 707/694; 707/693
(58) Field of Classification Search ............... 707/694, 707/999.204, 693
See application file for complete search history.

(56) References Cited

U.S. PATENT DOCUMENTS

| | | | |
|---|---|---|---|
| 2003/0126247 A1* | 7/2003 | Strasser et al. | 709/223 |
| 2005/0249240 A1* | 11/2005 | Boyce et al. | 370/469 |
| 2007/0016613 A1* | 1/2007 | Foresti et al. | 707/999.107 |
| 2007/0136541 A1* | 6/2007 | Herz et al. | 711/162 |
| 2010/0174878 A1* | 7/2010 | Davis et al. | 711/161 |

* cited by examiner

*Primary Examiner* — Apu Mofiz
*Assistant Examiner* — Bryan Walker
(74) *Attorney, Agent, or Firm* — AdvantEdge Law Group

(57) ABSTRACT

Systems and methods described herein may separate one or more enhancement layers of a multimedia file from a base layer of the multimedia file and treat the base layer and the enhancement layer differently when backing up and/or archiving the multimedia file (e.g., by giving the enhancement layer a lower priority than the base layer). By separating enhancement layers from multimedia files and treating the enhancement layers with a lower priority, these systems and methods may reduce the strain that large multimedia files put on data repositories and associated computing resources (e.g., storage space, network bandwidth, etc.) while still preserving and protecting enough of the multimedia file to keep important information that the multimedia file may contain intact.

20 Claims, 6 Drawing Sheets

SYSTEMS AND METHODS FOR BACKING UP MULTIMEDIA DATA

BACKGROUND

In the digital age, organizations increasingly rely on digitally-stored data. To protect against data loss, an organization may use a backup system to back up important data. In some situations, the organization may also use an archival system to preserve data or offload lesser-used data to a more economical storage device.

Multimedia files, such as image files, audio files, and video files, may consume backup or archival space in disproportion to their importance. For example, the size of an incidental video embedded in an email may outstrip the size of the actual email text by a factor of millions. This imbalance may be especially pronounced in the case of high-fidelity multimedia files (e.g., image files with a high resolution, audio files with a high bitrate, etc.). Nevertheless, multimedia files may contain vital information, either standing alone or as context for understanding or interpreting accompanying text. Accordingly, the instant disclosure identifies a need for efficiently backing up multimedia files.

SUMMARY

As will be described in greater detail below, the instant disclosure generally relates to systems and methods for backing up multimedia data. Systems and methods described herein may separate one or more enhancement layers of a multimedia file from a base layer of the multimedia file and treat the base layer and the enhancement layer differently when backing up and/or archiving the multimedia file (e.g., by giving the enhancement layer a lower priority than the base layer). For example, a method may include identifying a multimedia file subject to a data repository policy, identifying a base layer and at least one enhancement layer of the multimedia file, identifying an alternate data repository for the enhancement layer, separating the enhancement layer from the multimedia file, applying the data repository policy to the base layer, and applying the alternate repository policy to the enhancement layer.

Examples of the data repository policy include a backup policy and an archival policy. The alternate data repository policy may differ from the data repository policy in a variety of ways. For example, the data repository policy may specify a target storage volume for the multimedia file (including the base layer), whereas the alternate data repository policy may specify an alternate target storage volume for the enhancement layer. The alternate target storage volume for the enhancement layer may be a volume better suited for lower-priority data. For example, the alternate target storage volume may have a lower fault tolerance than the target storage volume and/or otherwise have a lower performance rating than the target storage volume.

The alternate data repository policy may also specify that the enhancement layer may be overwritten by data with a higher priority (e.g., if a storage device on which the enhancement layer is backed up or archived becomes full). In some examples, the multimedia file may be stored in association with an email account. In these examples, the alternate data repository policy may specify that the enhancement layer may be discarded if a quota associated with the email account is exceeded. Generally, the alternate data repository policy may, in a variety of ways, specify a trade-off between preserving the enhancement layer for the quality of the multimedia file and discarding the enhancement layer for data repository efficiency.

The systems described herein may separate the enhancement layer from the multimedia file by, first, separating the multimedia file into multimedia data and non-multimedia data. The systems described herein may then separate the multimedia data into one or more base layers and one or more enhancement layers using a multimedia codec corresponding to the multimedia file. In some examples, the systems described herein may also identify a compression scheme used for the multimedia data and use the compression scheme when separating the multimedia data into the base layer and the enhancement layer.

The systems described herein may also restore a previously divided multimedia file from a data repository. For example, a system may identify a request to restore a multimedia file from a data repository, determine that data within the multimedia file was separated due to an alternate data repository policy applied to at least one enhancement layer within the multimedia file, determine that the enhancement layer is still available, retrieve the base layer and the enhancement layer from the data repository, and then reconstruct the multimedia file with the base layer and the enhancement layer. The data repository may include a backup and/or an archive.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
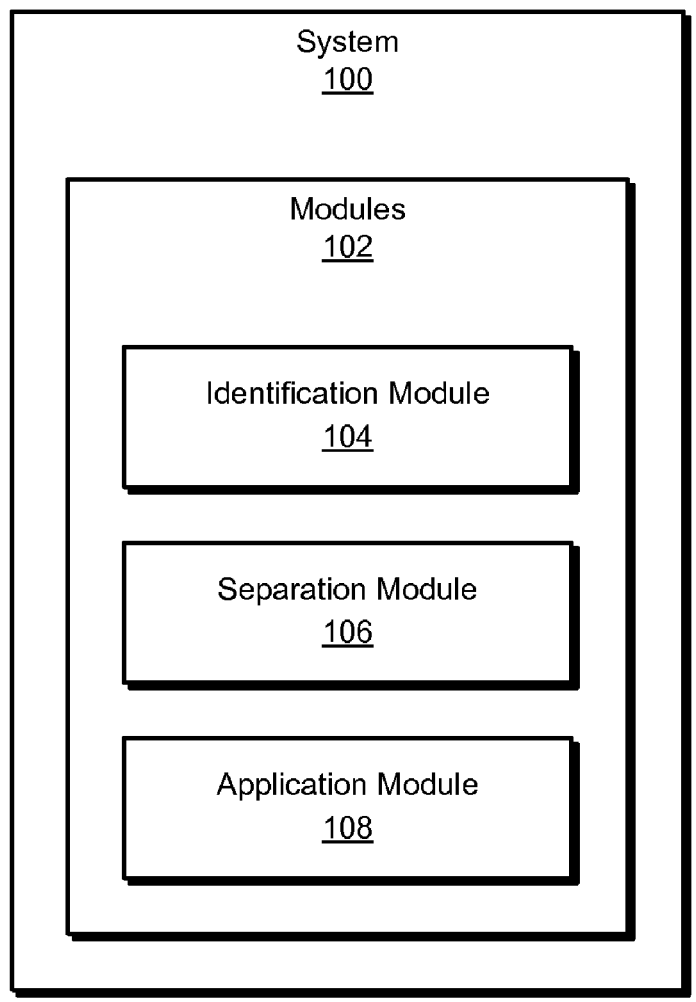
FIG. 1 is a block diagram of an exemplary system for backing up multimedia data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for backing up multimedia data. Systems and methods described herein may separate one or more enhancement layers of a multimedia file from a base layer of the multimedia file and treat the base layer and the enhancement layer differently when backing up and/or archiving the multimedia file (e.g., by giving the enhancement layer a lower priority than the base layer).

By separating enhancement layers from multimedia files and treating the enhancement layers with a lower priority, these systems and methods may reduce the strain that large multimedia files put on data repositories and associated computing resources (e.g., storage space, network bandwidth, etc.) while still preserving and protecting enough of the multimedia file to keep important information that the multimedia file may contain intact.

Figure 2:
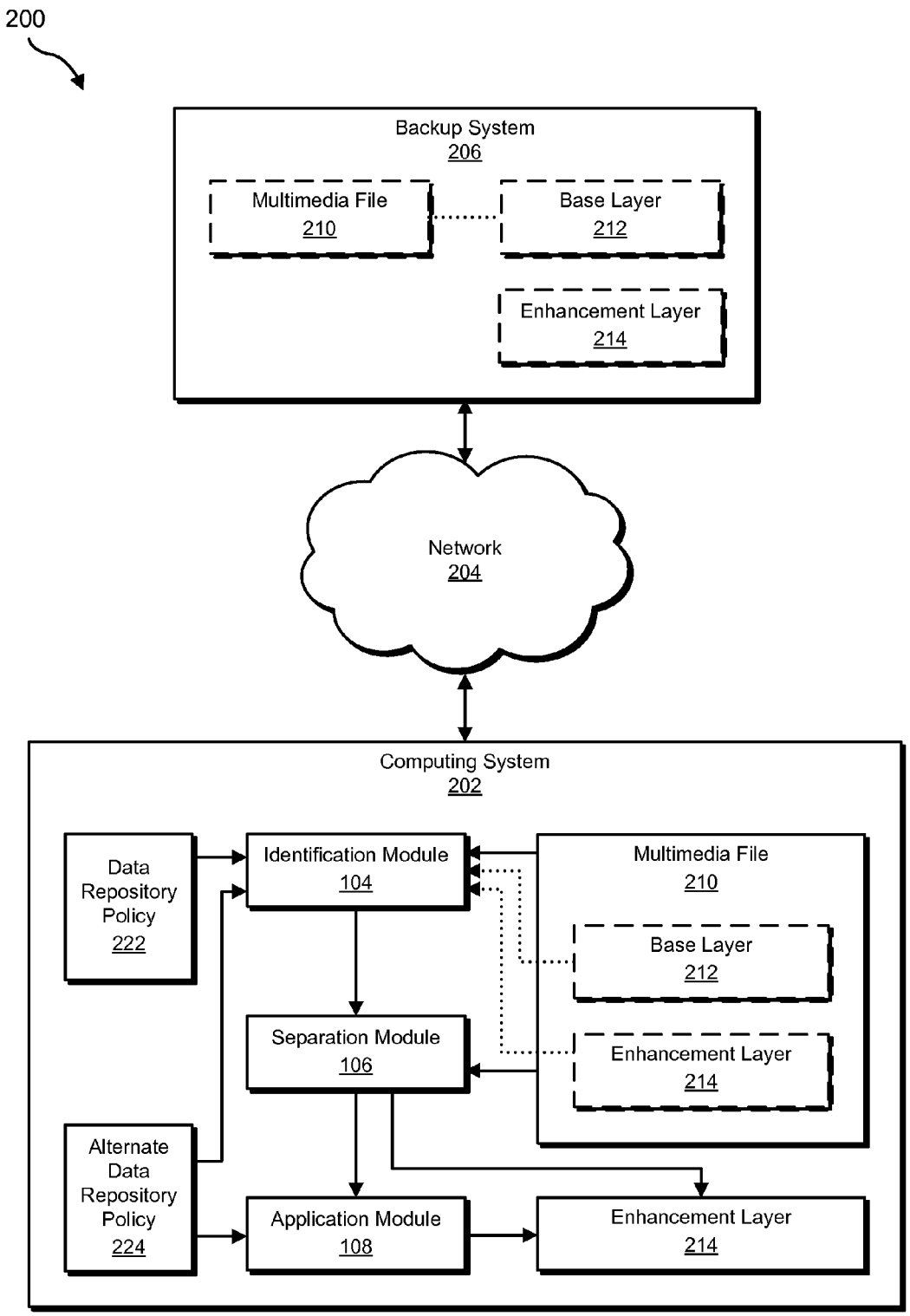
FIG. 2 is a block diagram of another exemplary system for backing up multimedia data.

The following will provide, with reference to FIGS. 1-2, detailed descriptions of exemplary systems for backing up multimedia data. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for backing up multimedia data. As illustrated in this figure, exemplary system 100 may include one or more modules 102 for performing one or more tasks. For example, and as will be explained in greater detail below, exemplary system 100 may include an identification module 104 programmed to identify a multimedia file subject to a data repository policy, identify a base layer and at least one enhancement layer of the multimedia file, and identify an alternate data repository policy for the enhancement layer. Exemplary system 100 may also include separation module 106 programmed to separate the enhancement layer from the multimedia file.

In addition, and as will be described in greater detail below, exemplary system 100 may include an application module 108 programmed to apply the data repository policy to the base layer and to apply the alternate data repository policy to the enhancement layer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or backup system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a backup system 206 via a network 204. Backup system 206 may be configured to provide one or more backup and/or archiving services to computing system 202. In one embodiment, and as will be described in greater detail below, computing system 202 may include identification module 104, separation module 106, and application module 108.

Identification module 104 may be programmed to identify a multimedia file 210 subject to a data repository policy 222. Identification module 104 may also be programmed to identify a base layer 212 of multimedia file 210 and an enhancement layer 214 of multimedia file 210. Identification module 104 may further be programmed to identify an alternate data repository policy 224 for enhancement layer 214. Separation module 106 may be programmed to separate enhancement layer 214 from multimedia file 210. Application module 108 may be programmed to apply data repository policy 222 to base layer 212 (e.g., along with metadata for multimedia file 210). Application module 108 may also be programmed to apply alternate data repository policy 224 to enhancement layer 214.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Backup system 206 generally represents any type or form of computing device that is capable of backing up, archiving, and/or storing data. Examples of backup system 206 include, without limitation, application servers configured to run certain software applications, backup servers configured to provide backup services, and/or storage devices.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and backup system 206.

Figure 3:
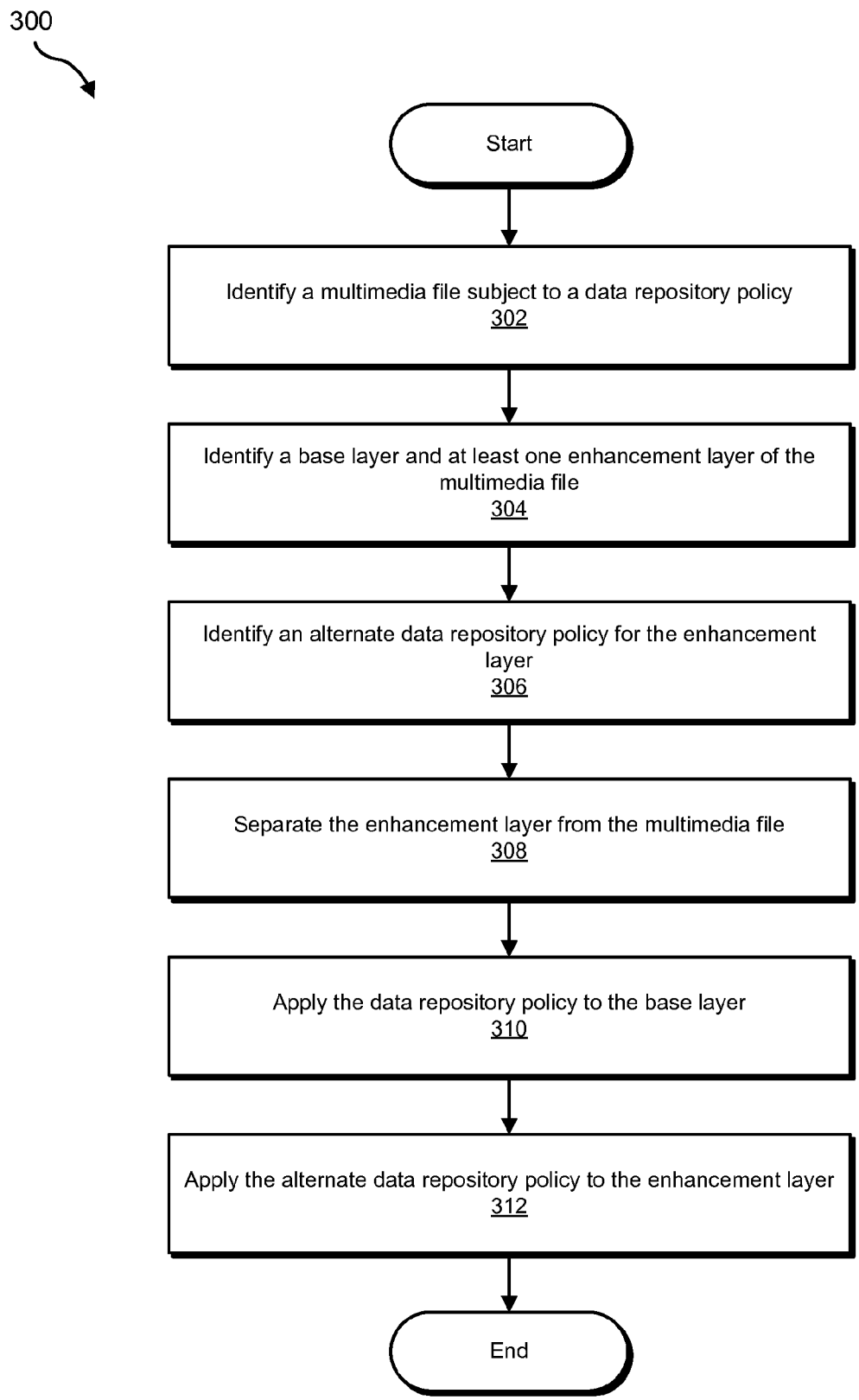
FIG. 3 is a flow diagram of an exemplary method for backing up multimedia data.

FIG. 3 is a flow diagram of an exemplary computer-implemented method 300 for backing up multimedia data. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a multimedia file subject to a data repository policy. For example, at step 302 identification module 104 may, as part of computing system 202, identify multimedia file 210 subject to data repository policy 222.

As used herein, the term "multimedia" may refer to images, audio, video, and/or any other content form that may be stored and/or presented at multiple levels of fidelity. A "multimedia file" may refer to any file, attachment, embedded object, or other data entity containing multimedia data.

Identification module 104 may perform step 302 in a variety of contexts. For example, identification module 104 may identify the multimedia file because the multimedia file is located in a directory and/or volume configured for backup and/or archival. In other examples, identification module 104 may identify the multimedia file as an attachment in an email, as an embedded object in a document (such as a slide presentation document or a word processor document), or in a variety of other contexts.

In some examples, identification module 104 may identify the multimedia file based on one or more traits of the multimedia file. For example, the fidelity of the multimedia data of some users (e.g., graphic designers, advertisers, etc.) may be critical, while the fidelity of the multimedia data of other users may be less important. Accordingly, identification module 104 may identify only those files owned by specified users (or, conversely, only exclude identifying files owned by specified users). Likewise, identification module 104 may identify only multimedia files of certain file types, of certain minimum sizes, in certain directories, etc.

As used herein, the phrase "data repository policy" may refer to any policy for backing up, archiving, and/or otherwise storing a file. A data repository policy may be defined by a set of rules, by a configuration setting, and/or simply by default behaviors of a data repository system.

In some examples, the data repository policy may include a backup policy. As used herein, the phrase "backup policy" may refer to any policy to backup, duplicate, mirror, and/or otherwise protect data. The backup policy may include one or more of a variety of directives, configurations, and/or defaults, such as a backup schedule, a target backup volume, standards for guaranteeing preservation of the data, etc. In other examples, the data repository policy may include an archival policy. As used herein, the phrase "archival policy" may refer to any policy to archive data, e.g., for long-term storage, for remote storage, for secure storage, etc. The archival policy may include one or more of a variety of directives, configurations, and/or defaults, such as a target backup volume and standards for guaranteeing preservation of the data.

At step 304 one or more of the systems described herein may identify a base layer and at least one enhancement layer of the multimedia file. For example, at step 304 identification module 104 may, as part of computing system 202, identify base layer 212 and enhancement layer 214.

As used herein, the phrase "base layer" may refer a layer of data (e.g., a bitstream) required to constitute a multimedia object with a minimum level of fidelity (e.g., a minimum resolution and/or accuracy for an image, a minimum bitrate for audio, etc.). In some examples, the base layer may be defined as part of a multimedia codec. In other examples, a multimedia codec may allow for near-arbitrary levels of fidelity (e.g., using embedded zero-tree wavelet coding, fine granularity scalability, etc.). In these examples, the base layer may constitute the extent of a bitstream required to render the multimedia object at a predetermined level of fidelity (e.g., the systems described herein may be configured to require a bitrate of 32 kilobytes per second as a minimum level of fidelity for audio files).

Likewise, the phrase "enhancement layer" may refer to a layer of data used to improve the fidelity of a multimedia object beyond the level of fidelity provided by the base layer. In some examples, the enhancement layer may be defined as part of a multimedia codec. In other examples, a multimedia codec may allow for near-arbitrary levels of fidelity. In these examples, the enhancement layer may constitute a portion of a bitstream beyond that which is required to render the multimedia object at a predetermined level of fidelity. The enhancement layer may improve the fidelity of the multimedia object beyond what the base layer provides according to a variety of metrics. For example, the enhancement layer may facilitate a greater spacial resolution, a greater color resolution, a greater frame rate, a greater sampling frequency, and/or a greater signal-to-noise ratio in the multimedia object. The enhancement layer may also provide other functionality in the multimedia object such as error detection.

Identification module 104 may perform step 304 in any suitable manner. For example, identification module 104 may identify the base layer and the enhancement layer according to the container of the multimedia file and the codec or codecs used for the multimedia data stored within the container.

At step 306 one or more of the systems described herein may identify an alternate data repository policy for the enhancement layer. For example, at step 306 identification module 104 may, as part of computing system 202, identify alternate data repository policy 224 for enhancement layer 214.

The alternate data repository policy may differ from the data repository policy in a variety of ways. For example, the data repository policy may specify a target storage volume for the multimedia file, and the alternate data repository policy may specify an alternate target storage volume for the enhancement layer. In some examples, the alternate target storage volume may include a volume with a lower fault tolerance than the target storage volume. Additionally or alternatively, the alternate target storage volume may include a volume with a lower performance rating than the target storage volume (e.g., in terms of speed, guarantees to deliver data within a certain timeframe, etc.). By allocating the alternate target storage volume for the enhancement layer, the systems described herein may conserve space for more important data on more reliable and/or better performing volumes.

In some examples, the alternate data repository policy may specify that the enhancement layer be backed up less frequently than the base layer. Additionally or alternatively, the alternate data repository policy may specify that the enhancement layer may be overwritten by data with a higher priority. For example, if the enhancement layer is backed up to a storage device that subsequently fills up, instead of allowing a subsequent backup attempt to fail, the systems described herein may allow a subsequent backup attempt to overwrite the enhancement layer (while, e.g., preserving the base layer). As another example, a long-term archival system may be configured to redundantly store archived data to allow for multiple devices failures over the lifetime of the archival system. If an unexpectedly large number of devices within the archival system fail, the systems described herein may allow the enhancement layer to be discarded in order to preserve an acceptable redundancy level for the remaining data.

In some examples, the multimedia file may be associated with an email account. In these examples, the alternate data repository policy may specify that the enhancement layer may be discarded if a quota associated with the email account is exceeded (i.e., would be exceeded if the enhancement layer were not discarded and a new email were allowed). Accordingly, an email user who has filled his quota may continue to send and receive emails by automatically (or with user approval) discarding enhancement layer data.

Generally, the alternate data repository policy may specify any sort of trade-off between preserving the enhancement layer for the quality of the multimedia file and discarding the enhancement layer for data repository efficiency. For example, the alternate repository policy may specify a formula for how much enhancement layer data to preserve given available space on a storage device and costs to apparently quality of the multimedia object. If the multimedia file includes multiple enhancement layers, the alternate data repository policy may assign varying priorities to the enhancement layers such that enhancement layers across multimedia files may be discarded evenly (e.g., rather than preserving all enhancement layers for one multimedia file while discarding all enhancement layers for another multimedia file in the same volume).

At step 308 one or more of the systems described herein may separate the enhancement layer from the multimedia file. For example, at step 308 separation module 106 may, as part of computing system 202, separate enhancement layer 214 from multimedia file 210.

Separation module 106 may perform step 308 in a variety of ways. For example, separation module 106 may separate the multimedia file into multimedia data and non-multimedia data (e.g., metadata of the multimedia file). For example, separation module 106 may follow a container format of the multimedia file to extract the multimedia data. Once separation module 106 has extracted the multimedia data from the multimedia file, separation module 106 may separate the multimedia data into the base layer and one or more enhancement layers using a multimedia codec corresponding to the multimedia file. For example, if the multimedia codec explicitly defines the base layer and enhancement layers, separation module 106 may separate the multimedia data accordingly. Additionally or alternatively, if the multimedia codec defines a bitstream for progressively increasing fidelity, separation module 106 may identify a predetermined minimum level of fidelity and divide the bitstream at the point at which the predetermined minimum level of fidelity is reached. In some examples, the systems described herein may apply a minimum level of fidelity even to multimedia files with explicitly defined base layers and enhancement layers. In these examples, separation module 106 may bundle one or more enhancement layers with the explicitly-defined base layer to constitute the "base layer" as described herein. Any additional enhancement layers may then be treated as the "enhancement layer" described herein.

In some examples, the multimedia data may be compressed. In these examples, separation module 106 may identify a compression scheme used for the multimedia data and separate the multimedia data into the base layer and the enhancement layer based on the compression scheme. For example, separation module 106 may decompress the multimedia data before separating the base and enhancement layers and then recompress the layers. Additionally or alternatively, separation module 106 may separate the base layer and enhancement layer by taking the compression scheme into account but without decompressing the layers.

At step 310 one or more of the systems described herein may apply the data repository policy to the base layer. For example, at step 310 application module 108 may, as part of computing system 202, apply data repository policy 222 to base layer 212.

Application module 108 may perform step 310 in any suitable manner. For example, application module 108 may apply the data repository policy to a version of the multimedia file with the enhancement layer stripped out. Additionally or alternatively, application module 108 may apply the data repository policy to the base layer, and store metadata and/or other non-multimedia data of the multimedia file separately. For example, application module 108 may create a file to represent the multimedia file (see, e.g., multimedia file 210 on backup system 206 in FIG. 3) and include in that file the original metadata of the multimedia file along with metadata for reconstructing the multimedia file (e.g., the location of the separately stored base and enhancement layers).

At step 312 one or more of the systems described herein may apply the alternate data repository policy to the enhancement layer. For example, at step 312 application module 108 may, as part of computing system 202, apply alternate data repository policy 224 to enhancement layer 214.

Application module 108 may perform step 312 in any suitable manner. For example, application module 108 may create a separate file for the enhancement layer and associate the separate enhancement layer file with a stub of the multimedia file. Application module 108 may then apply any of the potential alternate data repository policies as described earlier. For example, application module 108 may back up the enhancement layer less frequently than other data (such as the base layer). Additionally or alternatively, application module 108 may back up and/or archive the enhancement layer to an inferior volume. In some examples, application module 108 may discard the enhancement layer and/or configure another system to discard the enhancement layer if space is needed for other data.

Figure 4:
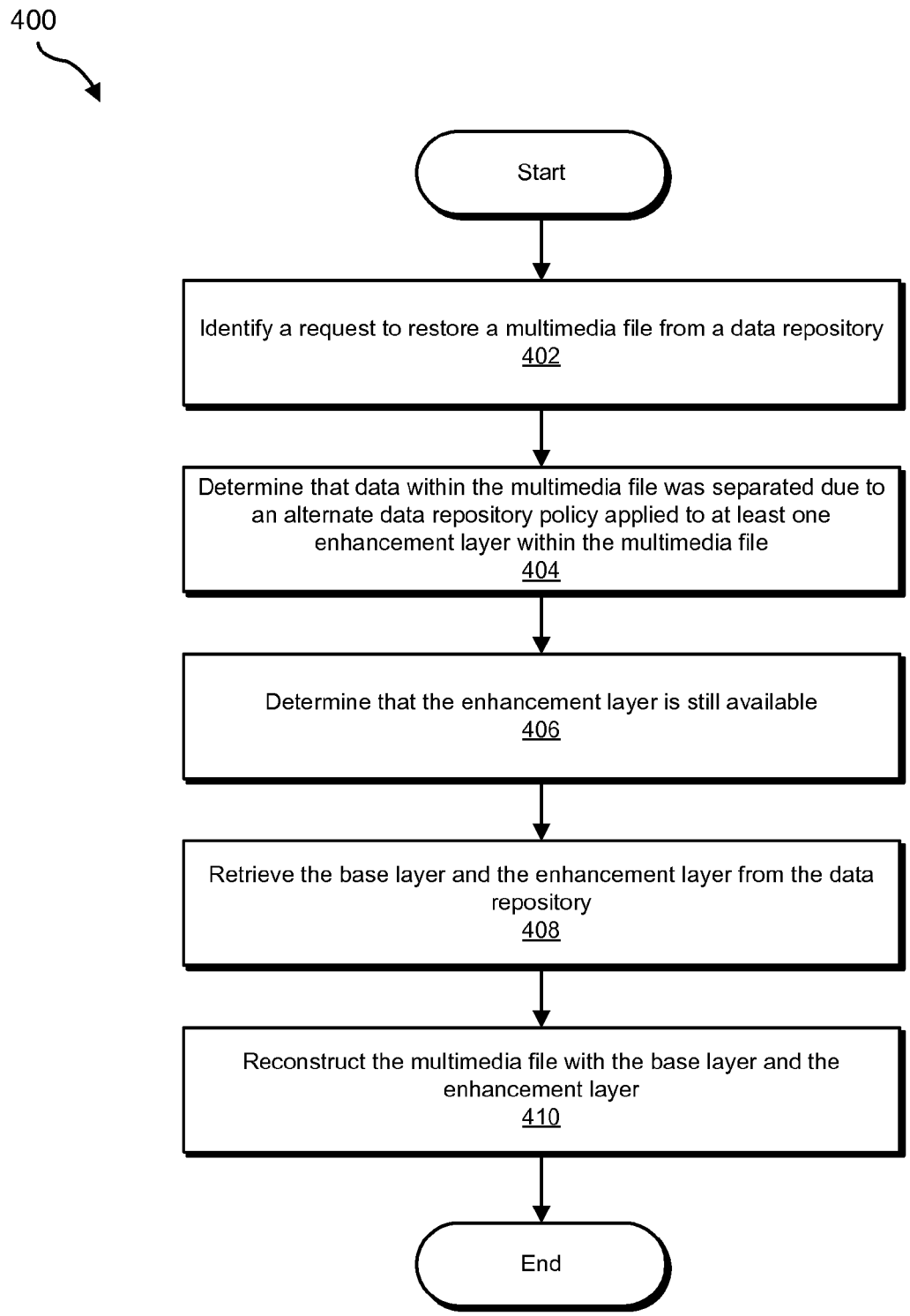
FIG. 4 is a flow diagram of another exemplary method for restoring backed up multimedia data.

FIG. 4 is a flow diagram of an exemplary computer-implemented method 400 for restoring backed up multimedia data. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

At step 402 one or more of the systems described herein may identify a request to restore a multimedia file from a data repository. For example, at step 402 one or more of the systems described herein may identify a request to restore multimedia file 210 from backup system 206 in FIG. 2.

The data repository may include a backup and/or an archive. Accordingly, the request to restore the multimedia file may occur in a variety of contexts. For example, the request to restore the multimedia file may occur as a part of a restoration of a backup. In another example, the request to restore the multimedia file may be directed towards retrieving the multimedia file from an archive. In some examples, the data repository may include multiple volumes and/or multiple storage devices.

At step 404 one or more of the systems described herein may determine that data within the multimedia file was separated due to an alternate data repository policy applied to at least one enhancement layer within the multimedia file. For example, at step 404 one or more of the systems described herein may determine that multimedia file 210 from FIG. 2 was separated into base layer 212 and enhancement layer 214.

The systems described herein may perform step 404 in any suitable manner. For example, the multimedia file may exist as a stub file that references the base layer and the enhancement layer. Accordingly, the systems described herein may identify the multimedia file as such a stub file. Additionally or alternatively, metadata indicating the separated status of the multimedia file may be separately stored by a data repository system.

At step 406 one or more of the systems described herein may determine that the enhancement layer is still available. For example, at step 406 one or more of the systems described herein may determine that enhancement layer 214 in FIG. 2 is still available.

The systems described herein may perform step 406 in any suitable manner. For example, the systems described herein may inspect a stub file for the multimedia file that references the enhancement layer. The systems described herein may then look up the enhancement layer and find that it has not been discarded or overwritten.

At step 408 one or more of the systems described herein may retrieve the base layer and the enhancement layer from the data repository. For example, at step 408 one or more of the systems described herein may retrieve base layer 212 and enhancement layer 214 in FIG. 2 from backup system 206.

The systems described herein may perform step 408 in any suitable manner. For example, the systems described herein may inspect a stub file for the multimedia file that references the base layer and the enhancement layer. The systems described herein may then look up the base layer and the enhancement layer and retrieve the base and enhancement layers from their respective storage locations.

At step 410 one or more of the systems described herein may reconstruct the multimedia file with the base layer and the enhancement layer. For example, at step 410 one or more of the systems described herein may reconstruct multimedia file 210 in FIG. 2 with base layer 212 and enhancement layer 214.

The systems described herein may perform step 410 in any suitable manner. For example, the systems described herein may create a container for the multimedia file based on metadata stored for the multimedia file. The systems described herein may then include the base layer and the enhancement layer within the container. In some examples, the systems described herein may restore the multimedia file exactly as it had existed. In other examples, the systems described herein may restore the multimedia file with substantially the same characteristics (e.g., fidelity, size, etc.) that it had before being placed in the data repository.

Figure 5:
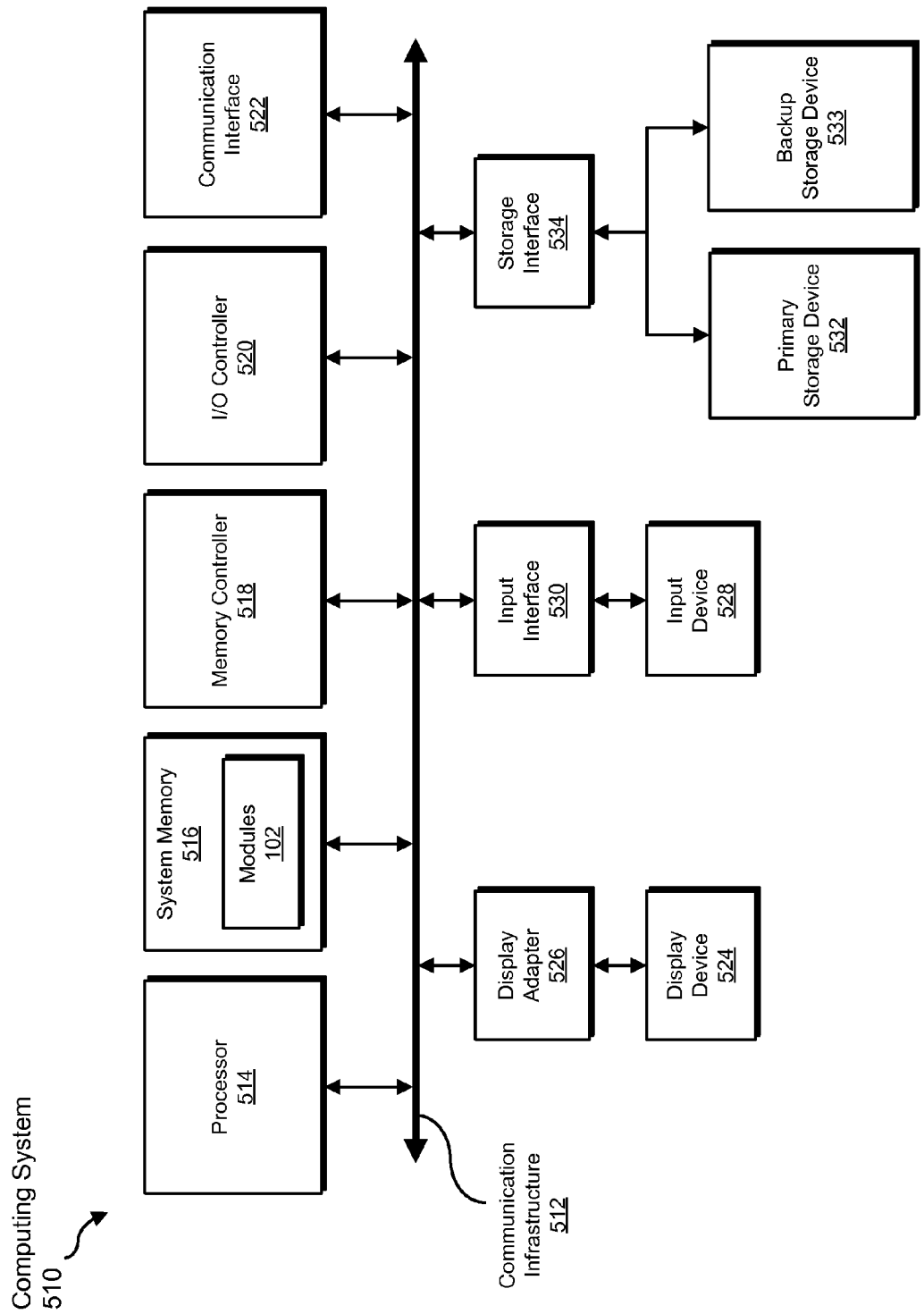
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, separating, applying, determining, retrieving, and/or reconstructing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, separating, applying, determining, retrieving, and/or reconstructing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, separating, applying, determining, retrieving, and/or reconstructing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, separating, applying, determining, retrieving, and/or reconstructing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, separating, applying, determining, retrieving, and/or reconstructing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, separating, applying, determining, retrieving, and/or reconstructing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
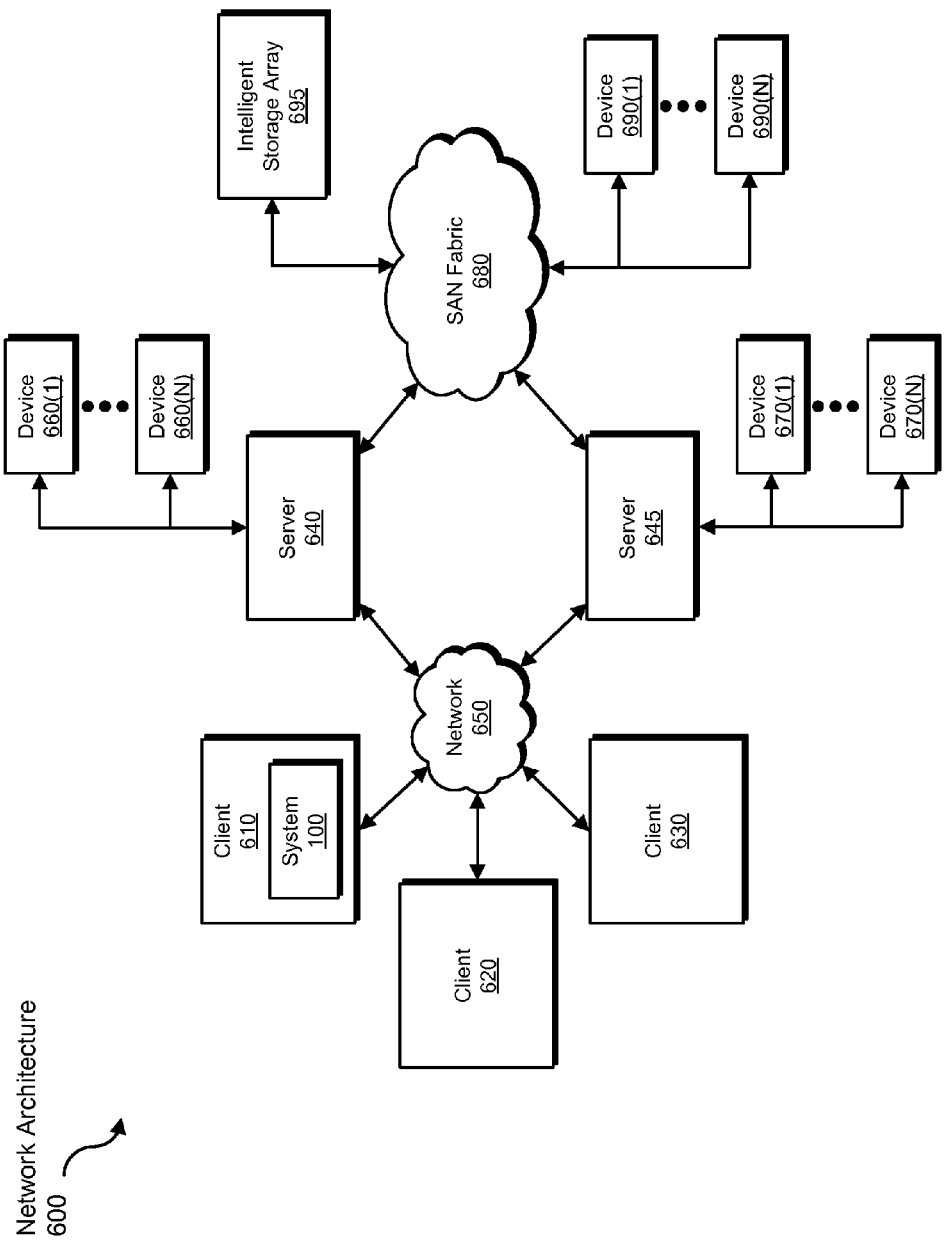
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, separating, applying, determining, retrieving, and/or reconstructing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for backing up multimedia data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a backup system into an efficient backup system which discriminates between different portions of a multimedia file. As another example, one or more of the modules described herein may transform a multimedia file into multiple components to which different data repository policies may be applied.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for backing up multimedia data, at least a portion of the method being performed by a computing device comprising at least one processor, the method comprising:

identifying a multimedia file that is an attachment to an email associated with an email account, wherein the multimedia file is subject to a data repository policy;

identifying a base layer and at least one enhancement layer of the multimedia file;

identifying an alternate data repository policy for the enhancement layer wherein the alternate data repository policy specifies that the enhancement layer is to be discarded if a quota associated with the email account would be exceeded if the enhancement layer were not discarded;

separating the enhancement layer from the multimedia file;

applying the data repository policy to the base layer;

applying the alternate data repository policy to the enhancement layer.

2. The computer-implemented method of claim 1, wherein:

the multimedia file includes a plurality of enhancement layers that comprises the at least one enhancement layer;

the alternate data repository policy assigns varying priorities to each enhancement layer from the plurality of enhancement layers.

3. The computer-implemented method of claim 1, wherein:

the data repository policy specifies a target storage volume for the multimedia file;

the alternate data repository policy specifies an alternate target storage volume for the enhancement layer.

4. The computer-implemented method of claim 3, wherein the alternate target storage volume comprises a volume with a lower fault tolerance than the target storage volume.

5. The computer-implemented method of claim 1, wherein the alternate data repository policy specifies that the enhancement layer may be overwritten by data with a higher priority.

6. The computer-implemented method of claim 1, wherein:

the enhancement layer is automatically discarded when the quota associated with the email account is exceeded.

7. The computer-implemented method of claim 1, wherein separating the enhancement layer from the multimedia file comprises:

separating the multimedia file into multimedia data and non-multimedia data;

separating the multimedia data into the base layer and the at least one enhancement layer using a multimedia codec corresponding to the multimedia file.

8. The computer-implemented method of claim 7, further comprising:

identifying a compression scheme used for the multimedia data;

separating the multimedia data into the base layer and the enhancement layer based on the compression scheme;

recompressing the base layer and the enhancement layer after separating the multimedia data.

9. The computer-implemented method of claim 1, wherein the alternate data repository policy specifies a trade-off between preserving the enhancement layer for the quality of the multimedia file and discarding the enhancement layer for data repository efficiency.

10. A computer-implemented method for backing up multimedia data, at least a portion of the method being performed by a computing device comprising at least one processor, the method comprising:

identifying a multimedia file subject to a data repository policy;

identifying a base layer and at least one enhancement layer of the multimedia file;

identifying an alternate data repository policy for the enhancement layer;

separating the enhancement layer from the multimedia file;

applying the data repository policy to the base layer by storing the base layer in a data repository;

applying the alternate data repository policy to the enhancement layer by storing the enhancement layer to an alternative data repository that has a lower performance rating than the data repository to which the base layer is stored;

identifying a request to restore the multimedia file from;

determining that data within the multimedia file was separated due to the alternate data repository policy applied to the enhancement layer within the multimedia file;

determining whether the enhancement layer is still available;

retrieving the base layer from the data repository and, when the enhancement layer is still available, retrieving the enhancement layer from the alternative data repository;

reconstructing the multimedia file with the base layer and the enhancement layer.

11. The computer-implemented method of claim 10, wherein:

the base layer comprises an extent of a bitstream needed to render the multimedia file at a predetermined level of fidelity;

the enhancement layer comprises a portion of the bitstream beyond that which is needed to render the multimedia file at the predetermined level of fidelity;

separating the enhancement layer from the multimedia file comprises dividing the bitstream into the base layer and the enhancement layer at a point in the bitstream at which the predetermined level of fidelity is reached.

12. A system for backing up multimedia data, the system comprising:

an identification module programmed to:

identify a multimedia file that is an attachment to an email associated with an email account, wherein the multimedia file is subject to a data repository policy;

identify a base layer and at least one enhancement layer of the multimedia file;

identify an alternate data repository policy for the enhancement layer, wherein the alternate data repository policy specifies that the enhancement layer is to be discarded if a quota associated with the email account would be exceeded if the enhancement layer were not discarded;

a separation module programmed to separate the enhancement layer from the multimedia file;

an application module programmed to:

apply the data repository policy to the base layer;

apply the alternate data repository policy to the enhancement layer;

at least one processor configured to execute the identification module, the separation module, and the application module.

13. The system of claim 12, wherein the identification module is programmed to identify the multimedia file by identifying only files owned by specified users for whom fidelity of multimedia data is critical.

14. The system of claim 13, wherein the specified users comprise at least one of:

a graphic designer;

an advertiser.

15. The system of claim 14, wherein the identification module is programmed to identify the multimedia file by identifying at least one of:

only files larger than a predetermined size;

only files of a predetermined type.

16. The system of claim 12, wherein the alternate data repository policy specifies that the enhancement layer may be overwritten by data with a higher priority.

17. The system of claim 16, wherein:

the multimedia file is archived in an archival system;

the alternate data repository policy specifies that if a redundant device in the archival system fails, the application module will discard the enhancement layer to preserve a predetermined redundancy level for data in the archival system.

18. The system of claim 16, wherein the application module is programmed to apply the data repository policy by:

detecting a subsequent backup attempt to a storage system to which the enhancement layer is stored;

determining that the storage system is full;

instead of allowing the subsequent backup attempt to fail, allowing the subsequent backup attempt to overwrite the enhancement layer while preserving the base layer.

19. The system of claim 18, wherein:

the multimedia file comprises a plurality of enhancement layers;

the alternate data repository policy assigns varying priorities to each enhancement layer in the plurality of enhancement layers;

the application module is programmed to apply the alternate data repository policy by discarding enhancement layers evenly across a plurality of multimedia files instead of preserving all enhancement layers for the multimedia file while discarding all enhancement layers from an additional file.

20. The system of claim 12, wherein the alternate data repository policy specifies a trade-off between preserving the enhancement layer for the quality of the multimedia file and discarding the enhancement layer for data repository efficiency.

* * * * *

UNITED STATES PATENT AND TRADEMARK OFFICE
CERTIFICATE OF CORRECTION

PATENT NO. : 8,321,388 B1
APPLICATION NO. : 12/914993
DATED : November 27, 2012
INVENTOR(S) : Amit Verma It is certified that error appears in the above-identified patent and that said Letters Patent is hereby corrected as shown below:

Claim 10, at column 16, line 1, should read:

identifying a request to restore the multimedia file;

Signed and Sealed this
Second Day of April, 2013

Teresa Stanek Rea
*Acting Director of the United States Patent and Trademark Office*